No. 713,630. Patented Nov. 18, 1902.
T. GIUSSANI.
APPARATUS FOR IMPREGNATING WOOD.
(Application filed Sept. 13, 1902.)

(No Model.) 2 Sheets—Sheet 1.

Witnesses.
Jno. T. Cross
Edw. W. Vaill Jr.

Inventor,
Tomaso Giussani
by /s/ Wm. Pettit
Attorney.

THE NORRIS PETERS CO., PHOTO-LITHO., WASHINGTON, D. C.

No. 713,630. Patented Nov. 18, 1902.
T. GIUSSANI.
APPARATUS FOR IMPREGNATING WOOD.
(Application filed Sept. 13, 1902.)

(No Model.) 2 Sheets—Sheet 2.

Witnesses.
Jno. F. Cross
Edw. W. Vaill

Inventor
Tomaso Giussani,
by / Ime. Pettis
Attorney.

UNITED STATES PATENT OFFICE.

TOMASO GIUSSANI, OF MILAN, ITALY.

APPARATUS FOR IMPREGNATING WOOD.

SPECIFICATION forming part of Letters Patent No. 713,630, dated November 18, 1902.

Application filed September 13, 1902. Serial No. 123,316. (No model.)

*To all whom it may concern:*

Be it known that I, TOMASO GIUSSANI, merchant, a subject of the King of Italy, residing at 10 Via Palestro, Milan, in the Kingdom of Italy, have invented certain new and useful Improvements in Apparatus for Impregnating Wood, of which the following is a specification.

The machine forming the subject of this invention is applicable to all methods of wood impregnation which involve the successive immersion of the wood first, say, in a hot bath and then in one or more cold baths or generally in a series of baths of any description.
This machine comprises two essential parts— viz., first, the vats, which are to contain the antiseptic liquid, and, second, the complete apparatus whereby the wood is placed in the first vat, (the hot bath,) is fed along within such vat, and is moved from the hot bath to the cold bath (the second vat) at a predetermined rate of speed, so as to cause it to traverse the cold bath and to leave such bath after impregnation.

The accompanying drawings represent by way of example one form in which the invention may be carried out for the specific purpose of impregnating railway-sleepers.

Figure 1:
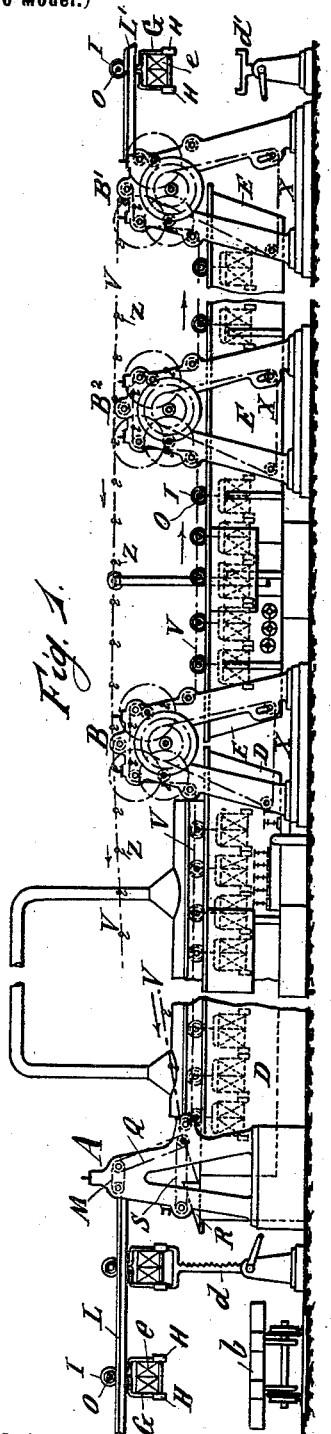
Figure 2:
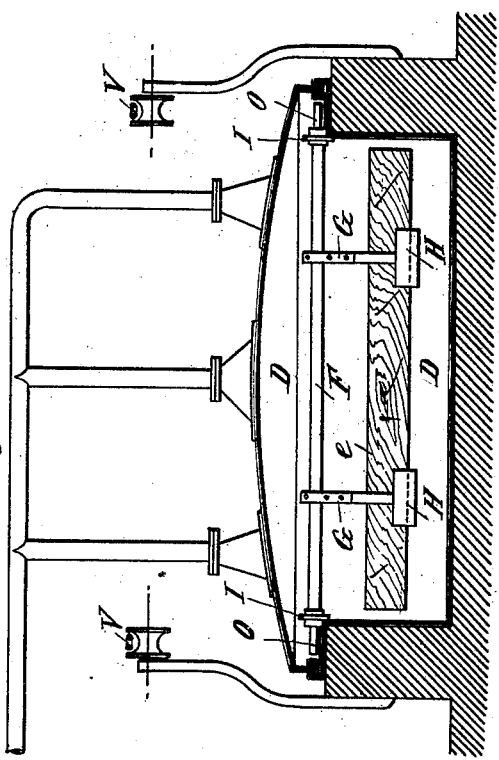
Figure 3:
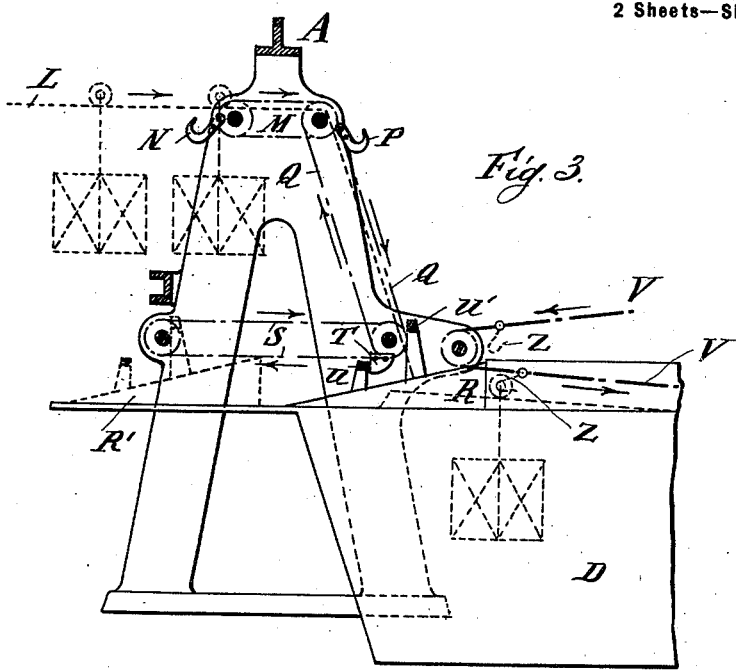
Figure 4:
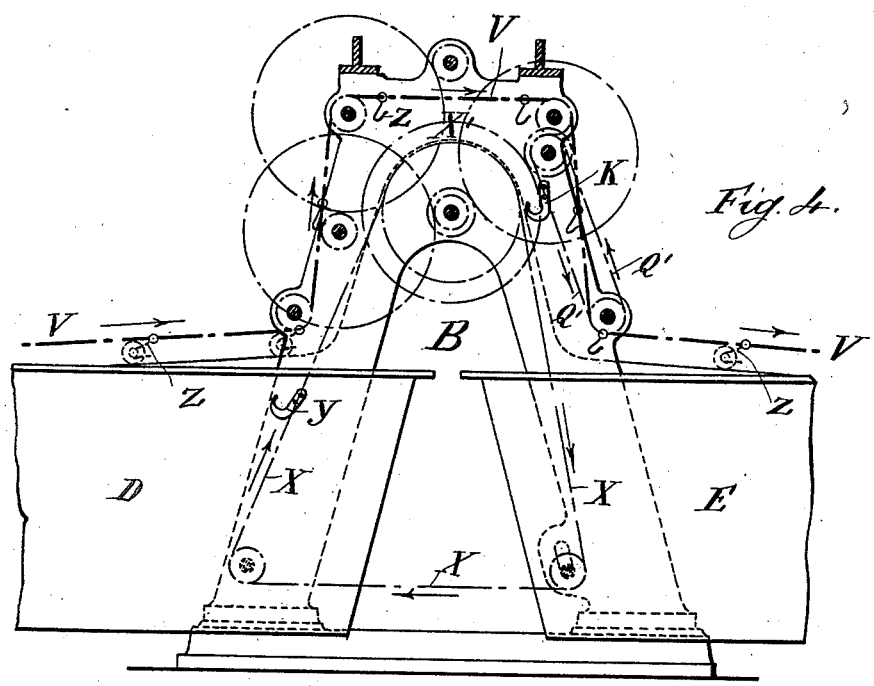

In the drawings, Figure 1 is a side elevation of the complete machine. Fig. 2 is a cross-section of the vat containing the hot bath; and Figs. 3 and 4 are enlarged views of parts of Fig. 1, showing, respectively, the devices whereby the sleepers are introduced into the hot bath, Fig. 3, and those by which the said sleepers are transferred from the hot bath to the cold bath, Fig. 4.

The vats are two in number, one serving as a hot bath and the other as a cold bath.

The vat D D, Figs. 1 and 2, in which the hot bath is prepared, is constructed of sheet-iron, is of rectangular section, and is closed at the top by means of a sheet-iron lid, the edge of which along each longitudinal side descends into a groove filled with the same liquid that is contained in the vat, thus forming a species of water seal serving to prevent the vapors evolved by the hot bath from escaping through the sides of the vat. The portion of the lid situated at the entrance of the hot bath is adapted to open whenever wood or timber is to be conveyed into the hot bath, while the portion of the lid situated at the discharge end of the vat opens when it is desired to transfer the wood from the hot bath to the cold bath. The first-named bath is heated by means of iron serpentine pipes, through which a current of steam is circulated. The condensation-water from these serpentines is directly drawn off by suction by means of the feed-water pump of the steam-boiler.

The hot bath is automatically fed by means of float-cocks with the liquid necessary to compensate for the loss caused by the absorption of liquid by the wood.

The vat, tub, or cistern E E, Fig. 1, which serves to hold the cold bath, may be of any suitable material—such as iron, wood, masonry or brickwork—strengthened or braced by suitable framework, &c., the main condition being that it should be perfectly water tight and proof against the action of any chemicals that may be used in solution.

For the purpose of cooling the liquid contained in the cold bath, so as to enhance the power of absorption of the wood, a current of cold water is made continually to circulate within the serpentines erected on the bottom of the vat or cistern and arranged along its walls.

The liquid absorbed by the wood in the cold bath is conveyed to the bath through iron pipes leading up from tanks or reservoirs specially provided for the purpose. These pipes automatically supply the requisite liquid, constantly maintaining the same level in the cold bath. The automatic regulation of this level is effected by means of a lever and float-cock.

The pieces of wood or timber e are during impregnation supported by a hollow iron cylinder F, Fig. 2, fitted with two stirrup-shaped holders G G, Figs. 1 and 2, between the arms of which the pieces of timber e are placed as they are brought to the machine on trucks b, the timbers being raised from the truck by means of a lifting-jack fitted with a handle d. Each arm of the stirrup-shaped holder is weighted with a cast-iron weight H, adapted to slide thereon and serving to add to the weight of the timber immersed in the bath and to keep such timber constantly immersed. The weights H may be changed according to the specific gravity or density of the liquid and wood to be impregnated. The hollow cylinder F is provided at each end with a wrought-iron trunnion or journal O, fitted "hot" into the cavity of the cylinder. Upon each of these journals there is mounted loosely a roller I, retained in place by means of pressure-rings or ferrules. The rollers I are each provided inwardly with a projecting flange not unlike that of a railway-carriage wheel and are adapted to travel upon two parallel guide-rails L, Figs. 1 and 3, before the introduction of the timber into the hot bath, then upon two similar guide-rails L', Fig. 1, after the timber has left the cold bath, and, lastly, either along the longitudinal edges of the vats themselves or along two parallel rails forming part of a separate frame unconnected with the vats while the timber is being treated in the bath.

The hollow cylindrical shaft F, supporting the timbers e to be impregnated, is moved toward the supporting frames or trestles A, Fig. 1, either by hand or by machinery. In the present instance this is supposed to be effected by means of a couple of endless chains M, Fig. 3, arranged to move horizontally and provided with hooked cramps N, which by means of their hooks symmetrically engage with the two ends or journals O of the said shaft, Fig. 2. The shaft F after having traversed horizontally the space between the operating-wheels of the chains by reason of the inversion of the cramps leaves its support and is instantly received by two other hooks P, Fig. 3, attached to a second pair of endless chains Q, Fig. 3, which cause the timber to complete its downward journey between the upper operating-wheel of the chains Q and the edge of the vat D, containing the hot bath, and to plunge, together with its bearers, into the hot liquid. In order to enable the wood to enter such hot bath, the portion R of the lid of the vat D, which is movable by means of the pair of endless chains S, adapted to travel horizontally, is moved to the position R', Fig. 3, and returns to its initial position when the timber has entered the vat D. These alternating movements are produced by the aid of the lugs or tappets T, fitted to the chains S, which by striking the projections u u' of the movable lid impart a reciprocating motion thereto.

In order to reduce friction of the edge R along its supporting-surface, I insert along that surface two series of rollers, which considerably facilitate the operation of the said movable lid.

The timber is moved within the hot bath by means of two parallel endless chains V, Fig. 1, which are set in motion symmetrically by means of gear-wheels fitted to the frames or standards B B' B² and operated from some external motion-transmitting gearing. (Not shown in the drawings.) The chains are provided with hooked cramps Z, arranged at a predetermined and constant distance apart and capable of turning on the pivot-pins of the chain-links. Each chain extends throughout the machine from end to end, starting at the base of the incline Q Q, since it is intended to convey the timber to either the hot bath or the cold bath. When the hooks Z reach the wheels guiding the chains V, mounted on the trestles or standards A, they take up such a position that the journals O, projecting from the rolling-support F, carrying the timbers, the moment they have descended into the hot bath engage with such hook of their own accord. The pairs of hooks engage successively as many timbers supporting shafts F as are necessary to fill the hot bath with timber.

The transfer of the timber from the hot bath to the cold bath, Fig. 4, takes place as follows: When the first of the shafts F, with its timber-carrying stirrups, has reached the end of the hot bath, if it were raised by means of the two chains V, the passage from the hot bath to the cold bath would take place at the comparatively low rate of speed at which those two chains are timed to move. There are, however, provided on the frames or standards B a pair of endless chains X, set in motion by wheels fixed to the said frames B and adapted to receive a symmetrical and synchronous motion from one common shaft. These chains are provided with one hook Y only, which, owing to the special arrangement of the gear-wheels operating the chains V and X at the moment when the timber-carrying shaft F reaches it, is invariably in the position required to enable it to grasp the projecting journals of the said shaft from underneath and thereby to raise the shaft with considerable rapidity. When the said shaft F, together with the timber it carries, has reached the position X', the hook Y becomes reversed and releases the journals of the said shaft, which then once more come into engagement with the hooks K of another pair of endless chains Q', connected by suitable gear-wheels to the gearing of the preceding chains. This additional pair of chains effects the descent of the timber-carrying shaft to the cold bath. The moment the said shaft has reached the end of this downward journey its journals by reason of the reversion of the hooks are released at very little distance from the edges of the vat or cistern containing the cold bath, upon which the rollers I will then rest. The endless chains V, extending from end to end of the machine, will then by means of their hooks Z engage with the timber-carrying shafts F as these one after another become lowered into the cold bath. While the timber is being moved in the upward direction, the portion of the lid of the vat D which is situated on the outlet side of the hot bath opens automatically upward under the pressure of the said timber-carriers, and, as it is furthermore furnished with counterpoise weights, it redescends to the closed position slowly and noiselessly upon its return.

The timber is removed from the cold bath by means of apparatus similar to that just described. A pair of trestles or standards B', Fig. 1, carries two pairs of endless chains similar to the chains X and Q' of Fig. 4. They remove the timber-carrying shafts from the bath by the aid of hooks secured to chains similar to X, Fig. 4, lift them, and then allow them to descend by means of hooks fixed to a chain similar to the chains Q', Fig. 4. The timber-carrying shafts are then delivered over to two parallel guide-rails L', Fig. 1, for their rollers to rest and travel on. The timbers may then be taken out of the stirrup-shaped holders G and deposited upon carriages or trucks either by hand or by special appliances, such as $d'$, whereupon they are arranged in piles of uniform size.

When it is desired to immerse the timber in two different liquids in succession, an additional pair of frames (standards or trestles) $B^2$, similar to B and B', is inserted between these and used to transfer the wood and its carriers from the first cold bath to another similar bath in the manner described above with regard to the transfer of the timber from the hot bath to the cold bath.

A movable wall or partition erected in a suitable position divides the vat E containing the cold bath into two perfectly-distinct compartments, in which the two liquids employed in the impregnation process are respectively contained.

The machine is operated by means of pulleys or gear-wheels mounted upon the trestles B B' $B^2$ and receiving motion either from one motor or engine common to all or from a separate motor provided for each trestle or frame, the different moving parts being all conected with each other by chains V, whereof the speed may be varied and regulated by means of change-wheels or change-pulleys.

What I claim, and desire to secure by Letters Patent of the United States, is—

Apparatus for impregnating pieces of wood or timbers more especially railway-sleepers by automatic, continuous and adjustable action, with liquids either hot or cold contained in vats arranged in succession, in which machine shafts supporting the devices which hold or carry the timbers to be treated, are adapted to travel or roll along tracks provided on or near the edges of the vats containing the impregnating-baths; the timbers being moved along the said vats, admitted into the first vat, discharged from the last vat, and transferred from one vat to another by means of endless chains moving at controllable rates of speed and provided with hooked cramps or engaging devices pivoted to the connecting-pins of the links of the said endless chains.

In testimony whereof I have hereunto set my hand, in presence of two subscribing witnesses, this 29th day of August, 1902.

TOMASO GIUSSANI.

Witnesses:
MICHELEDE DRAGO,
VIRGINIO CARNEVALI.